United States Patent
Mace et al.

(10) Patent No.: US 8,527,593 B1
(45) Date of Patent: *Sep. 3, 2013

(54) CHANGE OF AN ARCHIVED EMAIL PROPERTY IN THE EMAIL SYSTEM LOCAL STORE

(75) Inventors: Donald Mace, Hopkinton, MA (US); Shawn Duarte, Amherst, NH (US)

(73) Assignee: EMC Corporation, Hopkinton, MA (US)

( * ) Notice: Subject to any disclaimer, the term of this patent is extended or adjusted under 35 U.S.C. 154(b) by 275 days.

This patent is subject to a terminal disclaimer.

(21) Appl. No.: 11/731,331

(22) Filed: Mar. 30, 2007

(51) Int. Cl.
*G06F 15/16* (2006.01)

(52) U.S. Cl.
USPC .......... 709/206; 709/203; 709/204; 709/218; 709/219; 711/165; 711/170

(58) Field of Classification Search
USPC .......................................... 709/229, 20–206
See application file for complete search history.

(56) References Cited

U.S. PATENT DOCUMENTS

| | | | |
|---|---|---|---|
| 5,890,163 A * | 3/1999 | Todd | 1/1 |
| 5,946,000 A | 8/1999 | Hoel | |
| 6,604,096 B1 | 8/2003 | Couch | |
| 6,629,138 B1 | 9/2003 | Lambert | |
| 6,879,988 B2 | 4/2005 | Basin et al. | |
| 7,069,573 B1 | 6/2006 | Brooks | |
| 7,093,025 B1 * | 8/2006 | Gupta | 709/239 |
| 7,222,156 B2 * | 5/2007 | Gupta et al. | 709/206 |
| 7,243,298 B2 | 7/2007 | Yozell-Epstein | |
| 7,412,489 B2 | 8/2008 | Nowacki | |
| 7,523,222 B2 * | 4/2009 | Carlson et al. | 709/246 |
| 7,539,709 B1 | 5/2009 | Vengerov | |
| 7,590,693 B1 * | 9/2009 | Chan et al. | 709/206 |
| 2002/0032623 A1 | 3/2002 | Wheeler | |
| 2003/0208608 A1 * | 11/2003 | Merriam | 709/229 |
| 2004/0167941 A1 * | 8/2004 | Prahlad et al. | 707/204 |
| 2004/0221048 A1 | 11/2004 | Ogier | |
| 2004/0221295 A1 | 11/2004 | Kawai | |
| 2004/0225645 A1 | 11/2004 | Rowney | |
| 2005/0108435 A1 | 5/2005 | Nowacki | |
| 2005/0144520 A1 * | 6/2005 | Tuma et al. | 714/15 |
| 2006/0010213 A1 | 1/2006 | Mehta | |
| 2006/0010322 A1 | 1/2006 | Novack | |
| 2006/0031357 A1 | 2/2006 | Misra | |
| 2006/0080278 A1 | 4/2006 | Neiditsch et al. | |
| 2006/0101099 A1 | 5/2006 | Shaw | |
| 2007/0016648 A1 | 1/2007 | Higgins | |
| 2007/0061359 A1 | 3/2007 | Kilday | |
| 2007/0067399 A1 * | 3/2007 | Kulkarni et al. | 709/206 |
| 2007/0078768 A1 | 4/2007 | Dawson | |

(Continued)

OTHER PUBLICATIONS

Cemaphore Systems, "MailShadow 2.2, Disaster Recovery Done Right, Exchange Downtime: Not an Option," 2007, 2 pages, http:.cemaphore.com/.

(Continued)

*Primary Examiner* — Asad Nawaz
*Assistant Examiner* — Khaled Kassim
(74) *Attorney, Agent, or Firm* — Dergosits & Noah LLP; Todd A. Noah (57) ABSTRACT

An email archive system and associated techniques are described. Archived emails may be stored locally on a user's client computer in a local archive store. The email archive system and associated techniques may interact with an email message system and an email client application.

19 Claims, 8 Drawing Sheets

(56) References Cited

U.S. PATENT DOCUMENTS

| | | | |
|---|---|---|---|
| 2007/0113101 A1* | 5/2007 | LeVasseur et al. | 713/189 |
| 2007/0130264 A1* | 6/2007 | Walker | 709/206 |
| 2007/0168435 A1* | 7/2007 | Moraca et al. | 709/206 |
| 2007/0180033 A1 | 8/2007 | Singh | |
| 2007/0198797 A1* | 8/2007 | Kavuri et al. | 711/165 |
| 2007/0250552 A1* | 10/2007 | Lango et al. | 707/205 |
| 2008/0010350 A1* | 1/2008 | Chen et al. | 709/206 |
| 2008/0028028 A1 | 1/2008 | Chismark | |

OTHER PUBLICATIONS

Cemaphore Systems, "MailShadow: DR Done Right," 2007, 1 page, cemaphore.com/.

Microsoft Corporation, MSDN, "Sample Message Store," 2007, 1 page, msdn2.microsoft.com/en-us/library/ms530949.aspx.

Madhook, (Madshi.com), Home page, Jan. 30, 2006, 1 page, madshi.net/.

Madhook (Madshi.com), "madCodeHook," Product Description, Jan. 30, 2006, 1 page, madshi.net/madCodeHookDescription.htm.

Madhook, (Madshi.com), "madCodeHook," Product Description, printed Aug. 27, 2007, 1 page, //help.madshi.net/madCodeHook.htm.

Symantec Systems, "Symantec Enterprise Vault: Agents & Options," Product Description, 2007, 1 page, symantec.com/enterprise/products/agents_options_details.jsp?pcid=2244&pvid=322_1&aoid=322_offline_vault&tid=agents.

Symantec Systems, "Data Sheet: Data and System Protection, Symantec Enterprise Vault," Product Description, 2007, 3 pages, symantec.com/enterprise/products/agents_options_details.jsp-?pcid=2244&pvid=322_1&aoid=322_offline_vault&tid=agents.

* cited by examiner

CHANGE OF AN ARCHIVED EMAIL PROPERTY IN THE EMAIL SYSTEM LOCAL STORE

BACKGROUND

1. Technical Field

The techniques described herein relate in general to email, and in particular to archival of emails.

2. Discussion of Related Art

Email archive systems are known that archive emails from an email system to reduce the storage requirements for the email system.

BRIEF DESCRIPTION OF DRAWINGS

In the drawings, each identical or nearly identical component that is illustrated in various figures is represented by a like numeral. For purposes of clarity, not every component may be labeled in every drawing. In the drawings.

DETAILED DESCRIPTION

Applicants have appreciated that prior email archive systems can be improved upon in numerous ways. For example, prior email archive systems did not support certain email features that email systems provide, so that such features cannot be properly maintained for archived emails. Some of the techniques described herein enable an email archive system to support email system features previously unsupported by email archive systems (e.g., illustrating archived content in a preview pane of the email system and allowing a user to add or modify properties for an archived email). As a result, the user experience for archived emails is improved.

Also, prior email archive systems often took a significant amount of time to retrieve archived emails. In addition, Applicants have identified numerous ways in which the performance of an email archive system can be improved. Each of these techniques is described in detail below.

Emails are electronic messages of any type. They can include text, images and/or any other type of content. To send and receive emails, a user typically employs an email message system having a client/server architecture in which client computers communicate with a server computer over a network. In a typical client/server network architecture, functions may be divided between client applications that run on users' client computers and the server which responds to requests from the client applications. Client applications typically provide a graphical user interface that a user can view and manipulate. An email message system typically comprises an email message server that may manage email for a plurality of users, and an email message client that executes on a user's computer and provides a user interface for the user to send and receive emails. In this respect, an email message system typically supports the creation of user email accounts, and a user establishes an email account to send and receive email messages. Examples of email message systems include the OUTLOOK® email and collaboration client/MICROSOFT® Exchange email message service provided by Microsoft Corporation of Redmond, Wash. and the LOTUS NOTES® email client/DOMINO® email message service available from IBM Corporation. Some email systems also provide other email features, such as email-related reminders, email integration with an electronic calendar, color-flagged emails, etc.

Email has become a common and accepted method of communicating. As a consequence, it is not uncommon for a single user's email account to contain thousands of messages. Some of these messages may include significant amounts of data, such as large attachments. Managing the large number and high data storage requirements for emails can place a strain on network resources such as email servers and storage systems. In particular, the servers for many email systems are storage intensive and typically demand relatively high-performance storage resources to provide the desired user experience, which can result in expensive storage requirements for many email systems.

Email archive systems have been developed to reduce the costs associated with managing and storing emails. Archiving emails can reduce the storage resources needed for implementing an effective email system by offloading some of the emails on the system to less expensive storage. For example, one common technique used by email archive systems is to archive relatively old messages, based on the assumption that a user is less likely to view older emails than more recent emails so that any performance hit in retrieving messages from archive storage does not occur frequently enough to significantly degrade the user's experience.

Email archive systems typically are integrated with an email system (e.g., via the email client application) such that the email client application provides an indication to a user that an email has been archived, allowing the user to distinguish between archived and non-archived emails. For example, some email archive systems have an icon associated with each email in the email client which may differentiate between messages that are archived and those that are not. Emails that are not archived may be represented by one type of icon and emails that are archived may be represented by a different type of icon. An email (or portion thereof such as an attachment) that has been archived may be replaced on the email system by a "short-cut" identifier (also known as a "stub") that can be used to retrieve the email from the archive. The term "short-cut" is sometimes used to refer to the fact that an email has been archived and that at least a portion of its content has been removed from the email message system (e.g., the client application email store).

Emails that are archived may be stored in a separate storage unit from emails that are not archived (e.g., storage units managed by the archive system rather than the email system). In prior email archive systems, archived emails typically were stored remotely in slower and less expensive storage devices than were used by the email system to store non-archived emails. One disadvantage of this type of email archive system is that it can reduce the quality of the user's experience when the user attempts to read an archived email, because it can take longer to retrieve an archived email stored in slower data storage than it can to retrieve emails resident on the email system. Such a delay can be perceived as a significant decrease in performance from what users are accustomed to for opening non-archived emails, which can appear to open nearly instantaneously.

It should further be appreciated that when archived emails are stored only on a remote archive server, access to those emails requires that the email client application be operating in an online mode with network connectivity to the email archive server. Thus, a user working in a local mode with an email application may be unable to access any archived emails.

Attempts have been made to address some of the disadvantages of email archive systems by employing a local store for the email archive system on the client computer. Storing archived emails locally on a user's client computer may reduce the amount of time it takes to retrieve archived emails, and enable the user to access any archived emails in the local store even when offline (i.e., even if lacking connectivity to the archive server).

While providing a local store for the email archive system can provide a number of advantages, Applicants have appreciated that existing email archive systems that employ a local store can be improved upon in numerous ways described below. Thus, in some embodiments of the present invention, an improved email archive system is provided that employs a local email archive store. A user request for an archived email may be intercepted locally on the user's client computer, and the email may be provided from the local archive store on the user's device if the archived email is available in the local archive store. Storing emails locally on the user's client computer may be less expensive than some other forms of email storage, such as remote "tier 1" storage commonly used by an email system server to store non-archived emails for a user's account. Thus, from a cost perspective, relatively large volumes of a local storage medium (e.g., a hard disc in a user's computer such as a laptop or other personal computer) can be provided relatively inexpensively as a local archive store, which may be advantageous in that the larger the local archive store, the higher the "hit" rate for emails that a user accesses being available in the local archive store.

Several email archiving techniques are described in further detail below in sections I-IV. The techniques described herein may be implemented on any type of computing system. An illustrative computing system 10 illustrated in FIG. 1. However, it should be appreciated that the techniques described herein are not limited to being implemented on computing system 10, as they may be implemented on any suitable computing system.

Figure 1:
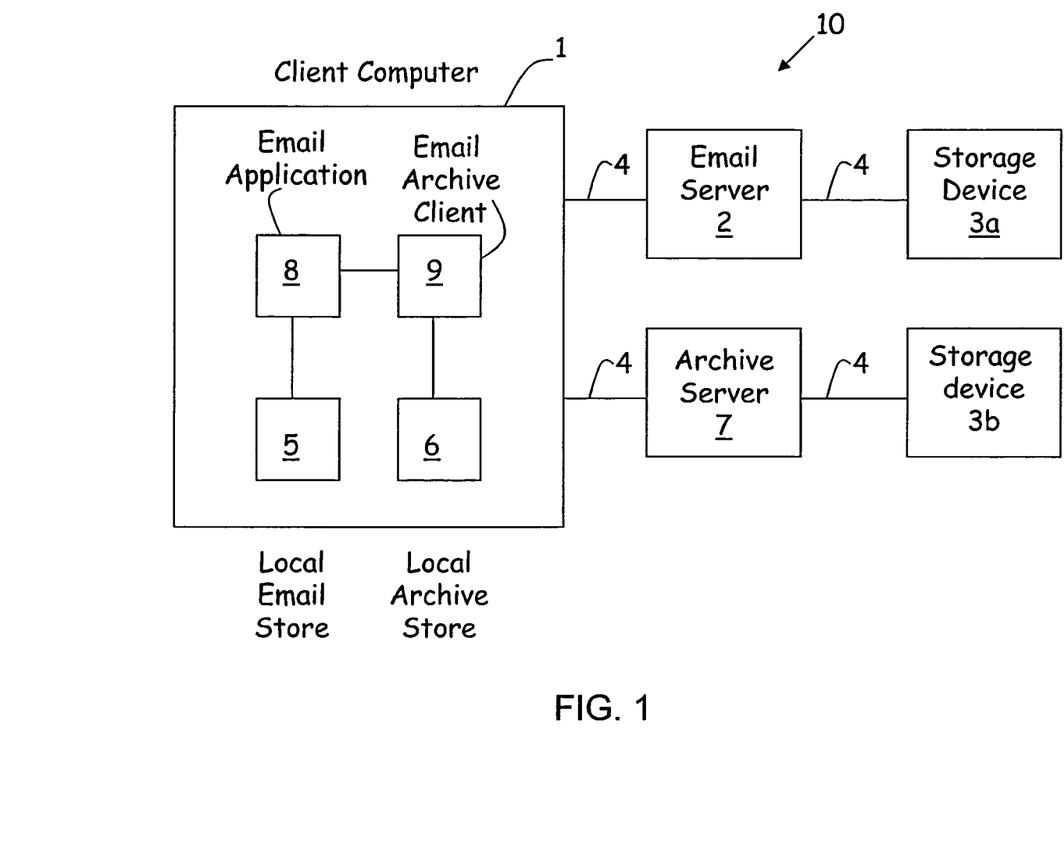
FIG. 1 is a block diagram illustrating an exemplary computer system including an email system and an email archive system, on which the techniques described herein may be implemented.

The illustrative computing system 10 comprises both an email system and an email archive system, both of which include components distributed amongst a number of computing devices. In particular, the system includes a client computer 1 that has an email client application 8 executing thereon. As discussed above, the email system also includes a local email store 5 that stores local copies of the emails in an email account for a user of the client computer 1. The email storage system further includes an email server 2 that stores emails on a storage device 3a. The storage device 3a for the email system may be a "tier 1" storage system of the type used conventionally in email systems. However, the techniques described herein can be implemented with email systems of any type, and are not limited to the configuration of the email system or the types of storage devices used thereby. It should be appreciated that the email server 2 may store emails for a number of users in addition to user of the client computer 1. For example, the email server 2 may be an email server for an organization or an enterprise (e.g., a business) and may store the emails for all individuals in the enterprise.

The illustrative computing system 10 also includes an email archive system that includes an email archive module or client 9 that resides on the client computer 1. In accordance with some techniques described herein, the email archive system further includes a local email archive store 6 to store locally at least some of the emails for the email account of the user of the client computer 1 that have been archived from the email system. The email archive system further includes a storage device 3b to store the emails archived by the email archive server 7. As discussed above, it is contemplated that the storage device 3b may employ less expensive storage than the storage device 3a employed by the email system, but the techniques described herein are not limited in this respect, and can be used with any email archive system that stores archived emails on any type of storage device, including the same type (or even devices) as the storage device 3a used by the email system.

The computing devices 1, 2, 7, 3a and 3b in FIG. 1 are all shown as being interconnected by various communication media 4. In one illustrative implementation, these communication media can be network connections of any type, and are referred to below as network connections. However, it should be appreciated that the techniques described herein are not limited in any respect by the ways in which various computing devices in the system communicate with each other.

A user may use client computer 1 to perform email-related functions using the email client application 8, which may display a user interface suitable for the user to perform email-related functions, such as reading and composing emails. For example, email client application 8 may be a software application that executes on client computer 1 and enables a user to perform a variety of email functions such as sending, receiving, composing, editing, searching for and/or organizing emails. Email client application 8 may also be capable of performing other email-related functions such as displaying reminders, color flagging of emails, providing integration with a calendar module, and/or any other functions, as the techniques described herein are not limited to use with email systems having any particular capabilities.

Email server 2 may manage the distribution of emails as part of an email message system that includes at least client computer 1, email server 2 and email storage system 3. Email client application 8 may send and receive emails to/from email server 2 via a suitable network connection 4 between client computer 1 and email server 2. Email server 2 may communicate with email storage system 3 to store and retrieve emails for one or more user email accounts on one or more client computers.

As part of the management of non-archived emails in the email message system, email client application 8 may store non-archived emails locally on client computer 1 in client application email store 5. When the user opens a non-archived email, the contents of the email may be retrieved from client application email store 5 and displayed using the email client application. As a further management function for non-archived emails, emails stored in client application email store 5 may be synchronized from time to time with the messages in a user account on the email server 2. For example, the email client application 8 may synchronize the content of client application email store 5 with the emails stored in the user's account (e.g., in email storage system 3 via the email server 2).

At least some of the emails in the email message system may be archived in accordance with an email archive system policy enforced by the email archive system. Any suitable policies may be implemented for determining which emails are to be archived, as the techniques described herein are not limited in this respect. For example, emails that exceed a certain age and/or a certain size may be archived by the email archive system. The email archive system policy may be selected by a network administrator, and implemented at least partially using email archive module 9. Emails (or portions thereof, e.g., attachments) that are archived may be at least partially removed from client application email store 5. In place of the full email, client application email store 5 may store a "stub" or "short-cut identifier" for emails that have been archived. A "stub" or "short-cut identifier" includes limited information about the email, such as the identity of the sender, identity of the recipient, and/or other limited information. The terms "stub" and "short-cut identifier" are used interchangeably herein. A stub does not include the full contents of the email or an attachment associated with the email, and thus requires less storage space. To obtain the full email contents and/or attachment(s), the archived email must be retrieved. In one embodiment, the information in the short-cut identifier can be sufficient to identify to the user the general nature of the email and/or can include sufficient information to uniquely identify the email so that it can be retrieved from the archive. However, it should be appreciated that the techniques described herein are not limited to forming a stub or short-cut identifier in any particular way.

In some embodiments, at least some archived emails and/or attachments are stored locally on client computer 1 in a local email archive store 6. If a user opens an archived email in the local store, the full email may be retrieved from local email archive store 6 and displayed for the user in the email client application. Storing archived emails and/or attachments locally on client computer 1 can reduce the amount of time needed to provide the archived email content to a user.

Figure 2:
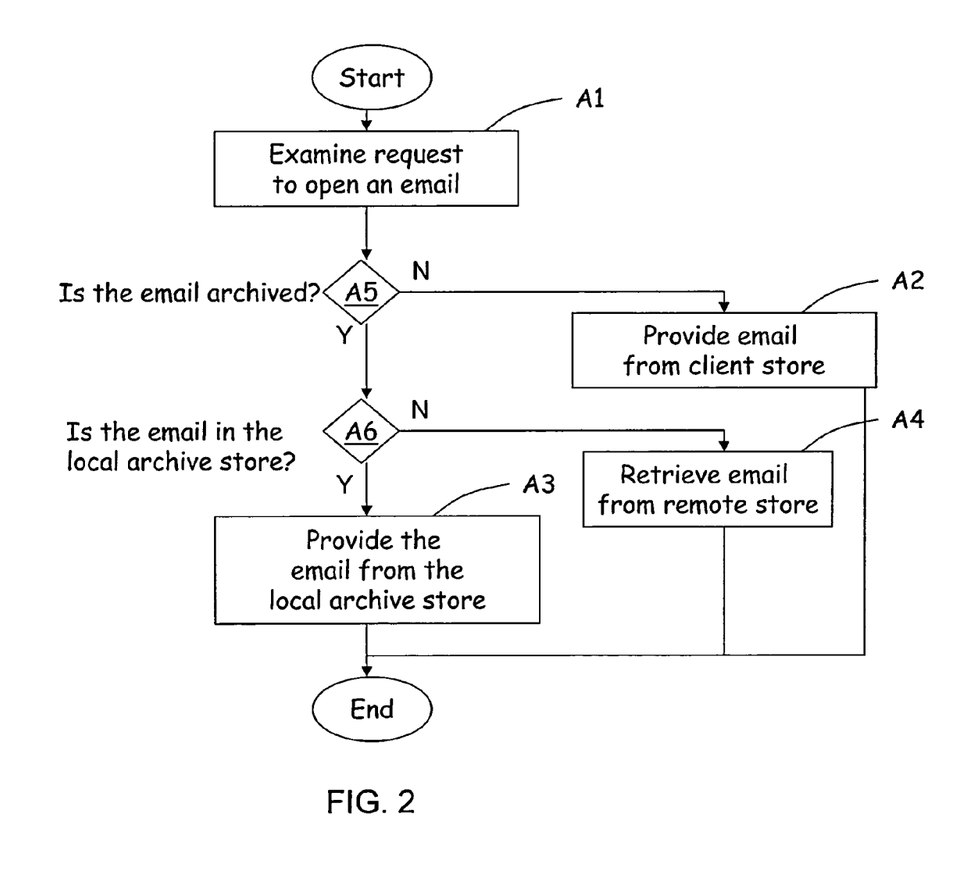
FIG. 2 is a flow chart of a method of providing an archived email to a user, according to one embodiment.

FIG. 2 is a flowchart illustrating a method of providing email content to a user (e.g., displaying, making available for printing, copying, forwarding, etc.), according to some embodiments. When a user selects or opens an email, email archive module or client 9 may examine this call at A1 and check (at A5) to see whether the email is archived. If it is not an archived email, the email client application 8 may retrieve the email from client application email store 5 and profile it to the user at A2. If the email has been archived, the email archive module 9 may check (at A6) to see if the content of the email has been stored locally in local email archive store 6. If so, the email is retrieved from local email archive store 6 at A3, provided to the user and the process ends. However, if it is determined at A6 that the content of the email has not been stored locally in archive email store 6, the email archive module 9 may retrieve (in A4) the email from storage system 3b by sending a request to archive email server 7, provide the email to the user and the process ends. Archived emails retrieved via the archive email server may be provided to user in any way. For example, the email may be re-stored directly to the local email store, be provided to the local archive store 6 from where it can be retrieved and provided to the user, or the email may be provided directly to the email application 8 local email archive store 6 via email archive server 7. Techniques for retrieving archived emails are discussed in further detail below.

As discussed above, although one illustrative computing system 10 has been described with respect to FIG. 1, it should be appreciated that the techniques described herein are not limited to being performed using the particular system described above. For example, the functional components of computing system 10 may be implemented using any suitable hardware and/or software. Client computer 1 may be any suitable client computer capable of sending and receiving emails and interacting with a user, such as a computer, a personal digital assistant (PDA) or cellular telephone, for example. Email server 2 and email archive server 7 each may be any suitable computing device capable of performing the described functions. Email server 2 and email archive server 7 each may be implemented on a single computer dedicated to performing the described functions for the server, may be distributed among a plurality of dedicated computers, or may be implemented on one or more competing devices that also perform other functions. For example, the email server 2 and the archive email server 7 may execute on the same one or more computers. Although, only a single client computer 1 is shown in FIG. 1, the email server 2 and/or the email archive server 7 may support a plurality of client computers.

As discussed above, each of storage device 3A used by the email system and storage device 3B used by the email archive system can be any type of suitable storage device. As discussed above, in one embodiment, it is contemplated that the storage device 3B will be a less-expensive type of storage than is used for the storage device 3a for the email system, but it should be appreciated that the techniques described herein are not limited in this respect, and can be deployed with computer systems that use any type of storage for either the email system or the email archive system, including systems that employ the same type of storage for both.

Email client application 8 may be any suitable email client application. Client application email store 5 may be any suitable type of storage, for example, the client application email store 5 (also referred to as a local email store) may be managed in any way by the email client application 8 and may be stored on any storage medium within or accessible to the client computer 1. For example, when the email client application is the OUTLOOK® email and collaboration client, the local email store may be the .OST file.

Email archive module 9 (also referred to as an email archive client) may be any software module configured to interface with the email client application 8 for providing archival of emails and other associated functions, as discussed in further detail below. For those devices that communicate over one or more network connections 4 as illustrated FIG. 1, any suitable wired or wireless network may be used, examples of which include a local area network, wide area network, the Internet, and a cellular network. These are described only by way of example, as any suitable communication medium can be employed.

The following sections I-IV describe several techniques that Applicants have developed related to email archive systems. It should be appreciated that the techniques described herein each may be used separately, all be used together or may be used together in any combination of two or more techniques.

I. Display of Archived Email Content in a Preview Pane

Conventional email archive systems did not enable an email system to provide certain features and capabilities for archived emails that are available for non-archived emails. For example, because of technical restrictions based on the way in which they are implemented, previous email archive systems did not allow the user to view the archived content of archived emails in the preview pane of the email client. Information that was not stored in the email "stub" could not be displayed. Applicants have developed an email archive system and associated techniques that enable viewing the archived content of archived emails in the preview pane, according to some embodiments.

Email client applications have a user interface that includes a selection interface showing a list of the user's emails. For example, the user's emails may be displayed as a list that is organized according to the order in which the emails are received, by sender, or other criteria (e.g., subject). To read an email, the user can "open" an email by double clicking on the portion of the selection interface at which the selected email is displayed, for example. Each time an email is opened, the content of the email is obtained and the email client application opens a new window to display the email content. Thus, if a user opens several emails, several windows will be opened to display each email separately. Opening each email in a separate window can be cumbersome because the user will later have to close each message to prevent a large number of windows from being open and cluttering the screen.

Figure 3:
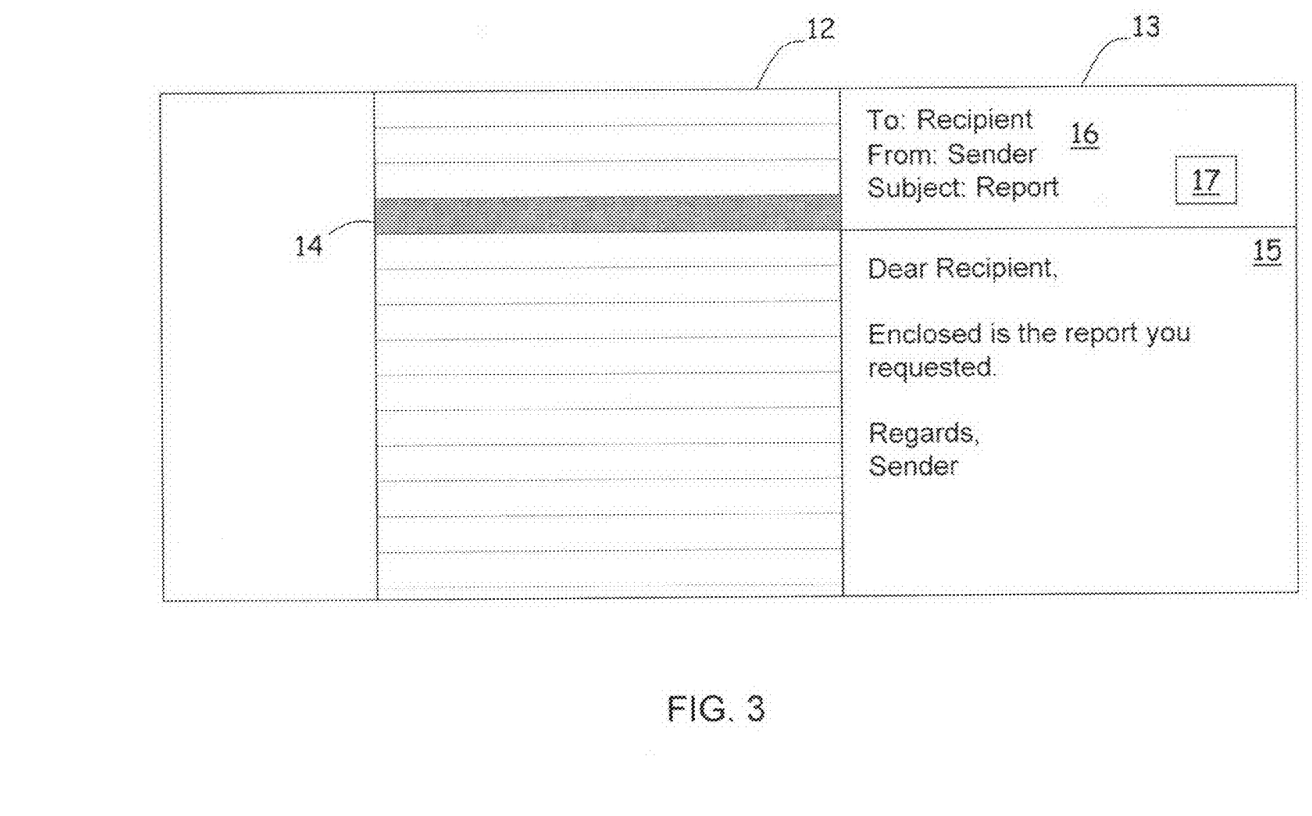
FIG. 3 is a diagram illustrating a selection interface and a preview pane displaying the contents of an archived email, according to another embodiment.

Thus, some email client applications provide another way for a user to read the contents of an email, i.e., the preview pane. The preview pane enables the user see the contents of an email without having to actually open the email. The preview pane is a user interface that may be displayed at the same time as the selection interface so that a user can view both interfaces at the same time. As illustrated in FIG. 3, when the user selects an email in the selection interface, the preview pane may automatically display the contents of the selected email. An email may be selected by single clicking on a message in the selection interface, for example. Some email client applications allow a user to quickly cycle through multiple emails by pressing the "down" or "up" keys on the keyboard to select different messages in the selection interface. Using the preview pane can save the user time in viewing an a email.

FIG. 3 illustrates a an example of a selection interface 12 and a preview pane 13 as they may appear when displayed by an email client application (e.g., email client application 8). When a user selects email 14 in the selection interface 12, the contents 15 of email 14 are obtained and displayed in preview pane 13. With conventional email archive systems, if email 14 were archived, the preview pane would not be able to display the archived contents 15 of email 14 upon being selected by the user. Rather, the email client application could only display information from the email's "stub" stored in the client application email store 5. The email stub may contain only limited information about the email, such as the sender, recipient, subject, etc., but less than the full content of the email. Such email stub information may be displayed in the email header 16 in the preview pane, for example. In some circumstances, the email stub may contain a certain amount of text that can be displayed in the preview pane. However, the email stub does not contain the full contents of the email, and thus the preview pane could not display the full contents of archived emails on prior email archive systems. In some circumstances, viewing the full contents of the email on prior email archive systems required the user to open the message, which caused the preview pane function to be less useful for some archived emails. For example, if the full archived email contained a large amount of data such as an image and/or an attachment, some of the email contents may not be stored in the email stub, and such an email would not be displayed properly in the preview pane. In one aspect of the techniques described herein, the preview pane may properly display the contents 15 of an archived email when the email is selected (e.g., using the selection interface). For example, the preview pane may display the email as it would appear to a user when the email is opened. Accordingly, the user experience for archived emails is improved by enabling enhanced preview pane functionality for archived emails.

One way to display the content of archived emails in the preview pane is to make the content of archived messages available to the email client upon the selection of an email in the selection interface. Typical email client applications do not provide a software interface allowing an email archive system to easily identify the selection of an email. Applicants have developed a technique to identify selection of an email, and in one embodiment leverage that technique to enable the content of archived emails to be displayed in the preview pane. In one aspect, this technique is implemented by software that intercepts a function call from the email system to an email application programming interface, such as a MAPI (Mail Application Programming Interface), to provide this functionality. MAPI is a standardized set of email-related functions designed for the WINDOWS® operating system available from Microsoft Corporation. MAPI functions are organized into several function libraries, also known as .DLL files. When performing an email related function, such as retrieving an email from the local store, the email client application can call one or more MAPI functions from the appropriate MAPI function library.

As one example, upon selection of an email in the selection interface, the email client application may call a MAPI function to retrieve the selected email from the local store to display the email in the preview pane. In some embodiments, this function call may be intercepted to determine if the email is archived in the local email archive store. If the email is archived in the local email archives store, the call may be passed to an email archive module function to service the request from the local archive store. Thus, in one aspect, email functions have been developed that may take the place of MAPI functions for archived emails. Although some of the techniques described herein relate to intercepting a MAPI function call, the techniques described herein are not limited to intercepting a MAPI function call, as any type of function call may be intercepted.

Figure 4:
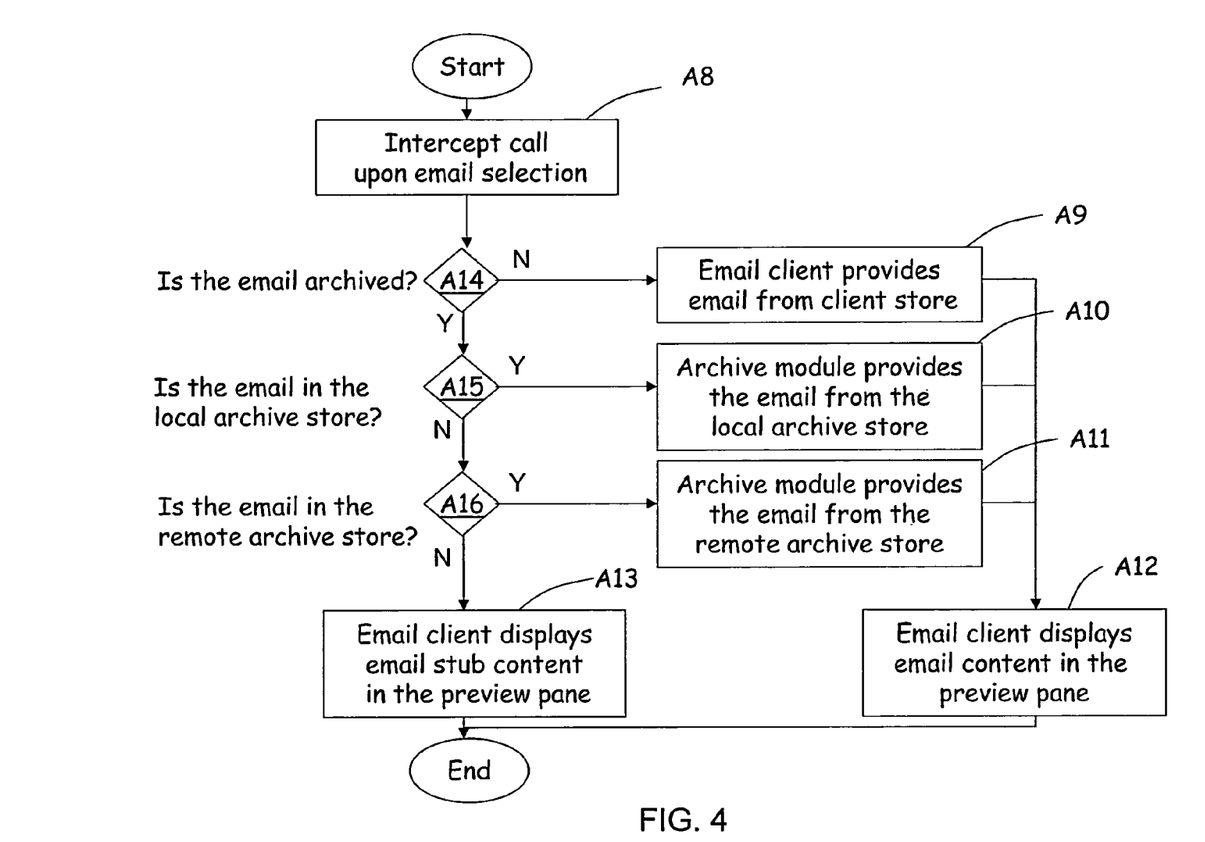
FIG. 4 is a flow chart of a method for displaying the contents of an archived email in the preview pane, according to another embodiment.

FIG. 4 is a flowchart illustrating a method of displaying archived content in the preview pane, according to some embodiments. In one aspect, the selection of a message in the selection interface may be detected by intercepting an operating system level function call (e.g., a MAPI call) from the email system that occurs upon the selection of an email (e.g., in the selection interface) in A8.

The email archive system may be designed to check emails when selected (at A14) to determine if they are archived, and if so, to obtain their content for display in the preview pane. This determination can be made in any suitable way. In some embodiments, the MAPI call may be intercepted by email archive module 9, which then may determine (A14) whether or not the email identified in the call is archived by checking the content for the email in client application email store 5. In one embodiment, the selection may be detected by intercepting a call to a MAPI function (such as, for example, the MSProviderInit function, which is the entry point to the EMSMdb32.dll MAPI provider function library). By checking the local email store 5, the email archive system can determine whether it includes the full email or a stub for an archived email. If it is determined (A9) that the call indicates selection of a non-archived message, the call may be passed to the called MAPI function, which may provide the content to the email client in its typical manner. The email client may then display the content in the preview pane (A12).

If the call indicates selection of an archived message, the call may be redirected to a different function, such as an entry function to a "replacement" function library designed to take the place of the MAPI provider function library for archived emails.

The replacement function library may perform similar functions as the MAPI function library, but may be configured to interface with email archive module 9 and to access local email archive store 6. After the function call has been intercepted, it may then be determined (A15) whether the message can be retrieved from the local email archive store. This determination may be done in any suitable way. For example, email archive module 9 (FIG. 1) may check local email archive store 6 to determine whether or not local email archive store 6 contains the contents of the email. If it is determined that the message can be retrieved from the local email archive store 6, the message may be retrieved from local email archive store 6 (A10), and the contents of the message may be provided to the email client so that it may be displayed in the preview pane (A12).

If it is determined that the selected message can not be retrieved from archive email store 6, it may be determined (A16) whether the message can be retrieved from the remote email archive store. For example, email archive module 9 may direct client computer 1 to send a request to email archive server 7 to retrieve the archived content. If network connectivity is available (e.g., if the user is not working in portable mode), the archived email may be retrieved and provided to the email client in A11. The contents of the message may then be displayed in the preview pane in act A12.

In some embodiments, the retrieval of the email from the email archive server may be performed using a SOAP (Simple Object Access Protocol) request. The archive email server may respond to client computer 1 by sending a reply that includes a SOAP attachment containing the email and its contents, or an indication that the requested email is not available in archive system if it is unavailable for any reason. It should be appreciated that the description of communicating with the local archive store 6 and the email archive server using SOAP is provided merely for illustrative purposes, and that other types of communication techniques can be employed.

If it is determined that the archived message content is not available from either the local archive store or the networked storage unit, the archived contents of the message are not returned to the email client and are not displayed in the preview pane. Instead of displaying the archived content of the archived email, the information available on the email stub may be displayed (A13).

Some archived emails may have one or more attachments. Prior email archive systems did not enable the preview pane to display the one or more attachments associated with an archived email. In some embodiments, the one or more attachments associated with an archived email are displayed in the preview pane as one or more attachment icons 17, as illustrated in FIG. 3. In one aspect, the attachment icon may be a visual representation of the attachment's file type. If the user wishes to open the attachment, the user may do so via the preview pane. For example, the user may "double click" on attachment icon 17 to open the associated attachment. Some archived emails may include inline attachments such information about images or other visual effects that are intended to be displayed in the body of the email when opened. In some embodiments, the image or visual effect may displayed in the preview pane when the email is selected by the user. Any suitable image may be displayed, including a moving image such as video. As another example, some archived emails may include audio information, such as a telephone message. When such an archive email is selected, the preview pane may display an audio interface that allows the user to listen to the audio information by manipulating the audio interface. For example, the audio interface may include buttons such as "play," "stop," "rewind" etc. that the user may select in the preview pane to play the audio content of the email. As a further example, the email may include a combination of two or more different types of content, such as video and audio.

It should be appreciated that the embodiments described herein that enables viewing the content of archived emails in the preview pane of an email client is not limited to the specific implementation techniques described above as alternative implementations are possible.

II. Local Email Archive Store Size Management

Applicants have appreciated that different users may have different requirements for email storage, different requirements for archival of emails, and different local storage resources to be allocated to a local email archive store. In some circumstances, it may be desirable to archive a relatively large number of emails to reduce the cost of email storage. However, some users may require a higher level of email availability, and may wish to archive a relatively small number of emails. Another factor in determining the amount of emails to archive is the amount of storage space (e.g., hard disk space) available on the user's device for local email storage, as some devices may have more space available for email storage than others. Relatively small devices such as cellular telephones, personal digital assistants (PDAs) and portable computers may not have as much data storage space as other devices, such as a desktop computer.

Applicants have appreciated that it may be desirable to allow a user to control the size of the local email archive store to suit the user's requirements. Thus, one embodiment makes the size of the local email archive store (e.g., local store 6 in FIG. 2) configurable by the user. Accordingly, the user may adjust the maximum size of the local email archive store 6 to suit the user's needs. For example, if the user desires to have quick access to archived emails, or if the user is planning to enter a portable mode wherein the email archive server may be unavailable, the maximum size of the local email archive store 6 may be increased by the user to increase the number of archived emails stored locally. Alternatively, if the user does not have a significant amount of disk space available, the user may choose to reduce the amount of storage space allocated to the local email archive store 6. In some embodiments, the user may change one or more parameters of the local email archive store 6 using a user interface configured to allow the user to adjust the one or more parameters of local email archive store 6. In some embodiments, the user may change the maximum allowed size of the local archive store and/or one or more criteria used for determining whether or not an archived email is to be included in the local archive store.

As one example, the user may access a local archive configuration interface to configure a parameter of the local archive store. The local archive configuration interface may be accessed by the user via a user interface provided by the email archive system, or in any other suitable way. The local archive configuration interface may display a visual indication of the current size of the local archive store, for example, and/or one or more user interface components that the user may interact with to change a parameter of the local email archive store, such as the maximum size of the local email archive store. In some embodiments, the local archive configuration interface may be implemented by email archive module 9 and may be integrated with the email client application 8 so that the interface may be presented by the email system.

When email archive module 9 receives an indication that a parameter of the local email store has been changed, email archive module 9 may manage the emails that are stored in local email archive store 6 accordingly. For example, the storage of emails in the local email archive store may be managed so that the amount of storage used by the local email archive store does not exceed a chosen maximum size. Any suitable criteria may be applied to select the archived emails to stay within the specified size.

As another example, the storage of emails in the local email archive store may be managed to indirectly impact the size of local archive store by controlling the selection criteria for emails in the local store. For example, the emails in the local archive store may match one or more selection criteria, such as email message size, the age of the email, the date on which the email was received, the presence and/or size of an attachment, the time at which the email was added to the local archive store, the time at which the email was most recently accessed, and other any other suitable criteria. Emails that do not match these criteria may not be retained in the local archive store and may be purged from the local email archive store if already stored therein. Emails may be purged form the local archive store in response to the user changing one or more parameters of the local email archive store, such as directly reducing the size of the local email archive store or changing a selection parameter. If the size of the local email archive store is reduced indirectly by the user, the email archive system may change the one or more criteria used to determine which emails should be stored in the local email archive store so that the size of the local email archive store is reduced. For example, the email archive system may reduce the amount of time that an email is stored in the local email archive store. However, it should be appreciated that any suitable parameter may be changed to effect a change in the user defined size of the local email archive store. In some circumstances, the size of the local email archive store may be increased, or the criteria for the local archive store relaxed. In response, the email archive system may take steps to backfill the local email archive store with emails that match the appropriate criteria.

Figure 5A:
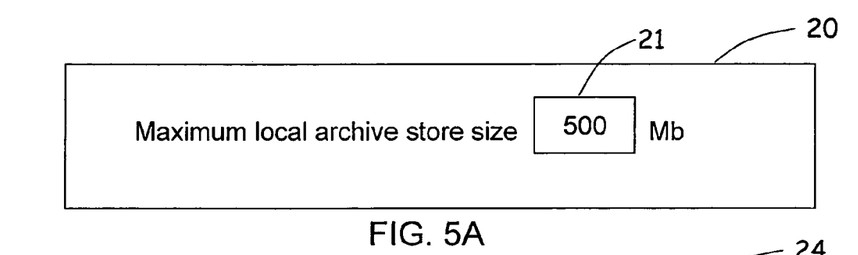
FIGS. 5A, 5B and 5C illustrate examples of user interfaces for changing the size of a local email archive store and a retention time for the local email archive store, according to other embodiments.
Figures 5B, 5C:
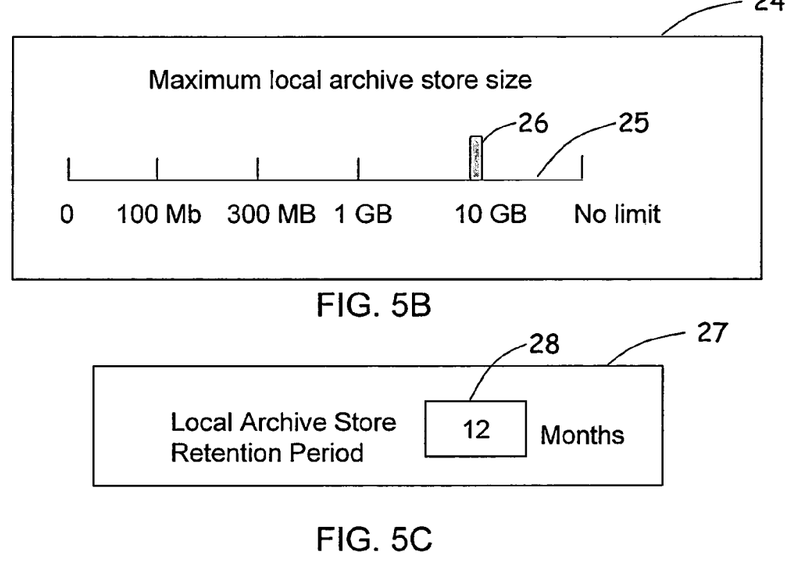

FIGS. 5A, 5B and 5C illustrate three examples of local archive configuration interfaces that a user may use to directly control a parameter of the local archive store, according to some embodiments. FIG. 5A illustrates a first local archive configuration interface 20 that displays user interface component 21, which is a text box that indicates to the user the current maximum size of the local archive store. If the user wishes to change the maximum size of the local email archive store, the user may select the text box and enter a different maximum local archive size. Accordingly, email archive module 9 may receive an indication that the size of the local email archive store 6 has changed and manage the storage of emails in the local email archive store accordingly. FIG. 5B illustrates a second local archive configuration interface 24 that displays user interface component 25 which is a slider interface that includes a slider 25. The user may change the maximum local archive size by moving the slider along the slider interface, as illustrated in FIG. 5B. FIG. 5C illustrates a third local archive configuration interface 27 that displays user interface component 28, which is a text box that indicates to the user the current retention period for which archived messages are stored in local email archive store 6. If the user wishes to change the retention period, the user may select the text box and enter a different retention period. In response to this change, email archive module 9 may receive an indication that the retention period has changed and manage the storage of emails in the local archive store accordingly. These are merely examples, as any suitable user interface modules may be used, such as text field, a slider, a button, etc., as the techniques described herein are not limited to any particular user interface implementation. In addition, while the user interfaces shown in FIG. 5 give the user the ability to directly control the size and/or retention period of the local archive store, alternate embodiments can allow control over other parameters as discussed above.

In some embodiments, an email search folder may be used to manage the size of the local archive store. An email search folder is virtual folder provided by an email system client that may be configured by the user to search for messages in the user's email account having user-specified criteria. To view the messages having the specified criteria, the user may select the search folder using the email client, and the messages in the search folder may be displayed in the selection interface of the email client. Applicants have appreciated that an email search folder may be used to select the criteria for messages that are to be archived in the local email archive store, based on the size of the local email archive store. For example, email archive module 9 may adjust one or more of the criteria used for the local archive store to achieve a local archive store having a target size or maximum set by the user. In some circumstances, email archive module 9 may iteratively adjust the criteria used until a suitable set of criteria are found that provides a local email archive store having the desired size. However, in some circumstances, a user may choose at least a portion of the criteria. Any suitable number and types of criteria may be used, such as the criteria discussed as above. As a result, the messages that match the criteria for the local archive store search folder may be stored in the local archive store, and appear within the search folder. However, archive messages that do not match the search folder criteria may not be stored in the local archive store. Archived messages that are not stored in the local email archive store may be retrieved from the remote email archive server.

Figure 6:
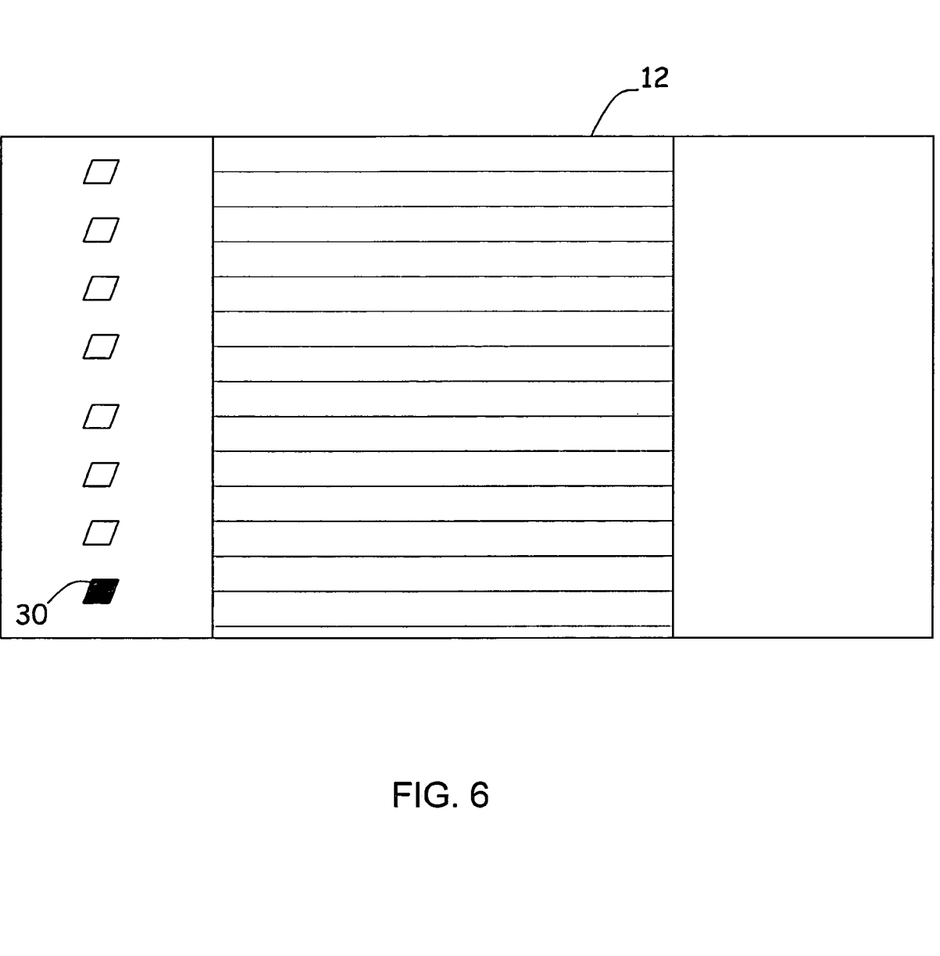
FIG. 6 illustrates the use of a search folder to manage a local email archive store, according to another embodiment.

FIG. 6 illustrates an example of a local email archive search folder 30 which has been selected by the user. In response to the selection of the local email search folder 30, selection interface 12 may display the emails that match the criteria for locally-archived emails.

In some embodiments, the user of the email account is provided with the capability to adjust one or more parameters (including size) of the local email archive store. The capability to modify these parameters may alternatively or additionally be provided to a different person (e.g., system administrator) in other embodiments.

Applicants have described some illustrative implementations to enable a user to change the size of a local email archive store. However, it should be appreciated that the techniques described herein are not limited to the above-described implementations, as any suitable implementation technique can be employed.

III. Change of an Archived Email Property in the Email System Local Store

Applicants have appreciated that various features provided by email systems for non-archived emails, (e.g., email-related reminders and email color flags) do not function properly for archived emails using prior email archive systems. For example, if a reminder is set by the user for an archived email, the reminder may not function properly so that the email client application may not remind the user to follow up in the way the user has requested. As another example, the email client application may not correctly display one or more properties associated with archived messages, such as an associated message color flag.

Applicants have appreciated that some email client applications (e.g., the OUTLOOK® email and collaboration client) rely on property information in the local client application email store 5, such an the email "stub," when implementing various email client features such as email-related reminders and color flags that rely on email properties. When changes in these properties were made to an archived email, prior email archive systems only updated the archived copy of the email (e.g., in the local archive store) and did not update the client application's local email store 5 to reflect the changes made to these properties. As a result, the properties in the local store that the email client would rely on for a feature provided by the email system (e.g., a reminder) would not be updated so that the email system would not properly implement the feature set by the user.

Figure 7A:
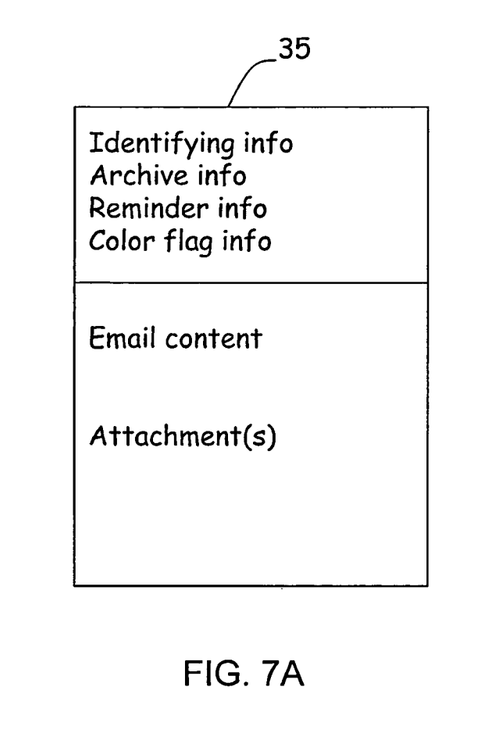
FIGS. 7A and 7B respectively illustrate an archived email and an email stub.
Figure 7B:
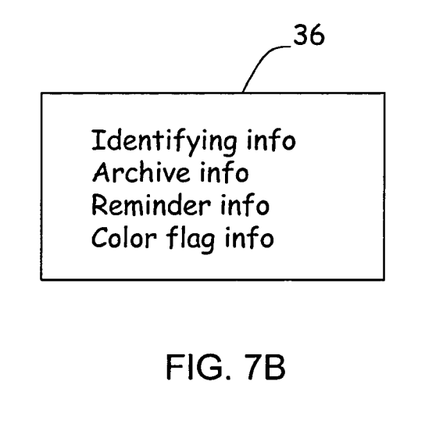

In accordance with some embodiments, the portion of an archived email (e.g., an email "stub") remaining in the client application's local message store is updated to reflect a change made to a property associated with an archived email message. Such updating may be performed by email archive module 9 in response to a user editing a property associated with an archived email using the email client application 8. As a result of these properties being updated in the local store for the email client, various email client application features that rely on such properties may function properly with archived emails, and the user experience with archive messages has been improved FIGS. 7A-B, respectively, illustrate an archived email 35 and an email stub 36 that remains in the email system after archival. According to one embodiment, in response to a change in a property of archived email 35, email stub 36 is updated accordingly to reflect the change in one or more property of archived email 35. As a consequence, various email client application features may function appropriately with archived emails. Some examples of the properties that may be updated have been described above (e.g., reminders and color flags) but it should be appreciated that the techniques described herein can be used to update any property made archivable by the email system.

IV. Further Applications and Example Computer System

Although the techniques described herein are primarily discussed in the context of an email archive system, any of these techniques may be used in other suitable applications. As one example, the techniques described herein may be used for local archiving of documents in a computer system having a document management system that uses a document server for managing the storage of documents. Document servers enable storing documents in such a way that a plurality of users can access a document. The techniques described herein may be used for document management in similar manner as described above with respect to email archive systems. Documents may be locally archived on a user's device, enabling increased document availability and decreased system cost. One or more suitable modifications may be desired with respect to an email archive system, such as enabling support for a concurrency control system to make sure that only one user can make changes to a document at a time.

In some implementations, a document management system may be integrated with a email message system. For example, a email client application may provide a suitable user interface that allows a user to access documents through the document management system. One example of a suitable document management system may include the SHAREPOINT® team services system available from Microsoft Corporation. However, any suitable document management system may be used.

It should be appreciated that the techniques described herein may be used in any of a variety of applications, not limited to email archive systems or document management systems. Also, the techniques described herein may be implemented in any suitable hardware and/or software, some examples of with are described with respect to FIG. 8

Figure 8:
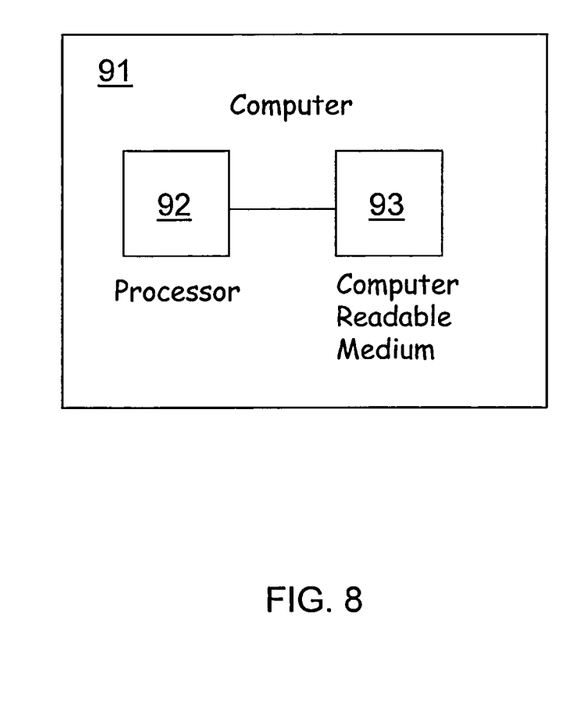
FIG. 8 is a block diagram illustrating an example of a computer on which embodiments may be implemented.

FIG. 8 is a block diagram illustrating an example of a computer 91 on which embodiments may be implemented. Computer 91 may be suitable to function as one or more of client computer 1, email server 2 and email archive server 7, for example. It should be appreciated that the above-described embodiments can be implemented in any of numerous ways. The embodiments may be implemented using hardware, software or a combination thereof. When implemented in software, the software code can be executed on any suitable processor 92 or collection of processors, whether provided in a single computer 91 or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments of the present techniques described herein comprises at least one computer-readable medium 93 (e.g., a computer memory, a floppy disk, a compact disk, a tape, etc.) encoded with a computer program (i.e., a plurality of instructions), which, when executed on a processor (e.g., processor 92), performs the above-discussed functions of the embodiments of the present invention. The computer-readable medium 93 can be transportable such that the program stored thereon can be loaded onto any computer environment resource to implement one or more embodiment(s). In addition, it should be appreciated that the reference to a computer program which, when executed, performs the above-discussed functions, is not limited to an application program running on a host computer. Rather, the term computer program is used herein in a generic sense to reference any type of computer code that can be employed to program a processor to implement the above-discussed aspects of the present invention.

It should be appreciated that in accordance with several embodiments wherein processes are implemented in a computer readable medium 93, the computer implemented processes may, during the course of their execution, receive input manually (e.g., from a user).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments in detail, various modifications and improvements will readily occur to those skilled in the art. Such modifications and improvements are intended to be within the spirit and scope of the invention. Accordingly, the foregoing description is by way of example only, and is not intended as limiting. The techniques described herein are limited only as defined by the following claims and the equivalents thereto.

What is claimed is:

1. A method for use in a computer system comprising an email message system that manages a plurality of email messages and an email archive system, wherein the email message system supports creation of user email accounts accessible by an email message client that executes on a client computer that a user of the client computer having an email account operates to manage the user's email messages accessible via the user's email account, the user's email messages comprising at least a portion of the plurality of email messages, the method comprising:

(A) creating a local email archive store on the client computer to store at least one archived email message having at least one property that includes a first property setting, wherein the archived email message was previously stored in a local email store on the client computer and replaced with a short cut identifier in the local email store on the client computer, the short cut identifier including first information for retrieving the archived email message from the local email archive store, and second information comprising the first property setting of the at least one property;

(B) in response to a user of the client computer editing the at least one property associated with the at least one archived email message, updating the second information of the short cut identifier stored in the local email store to reflect the edit to the at least one property associated with the at least one archived email message.

2. The method of claim 1, wherein the editing of the at least one property comprises adding a property to the at least one archived email message.

3. The method of claim 1, wherein the at least one property comprises a reminder time.

4. The method of claim 1, wherein the at least one property comprises a color flag.

5. The method of claim 1, wherein the editing of the at least one property comprises adding a reminder relating to the at least one archived email message.

6. The method of claim 1, wherein the updating the second information of the short cut identifier stored in the local email store comprises changing the first property setting to a second property setting, different from the first property setting.

7. A computer program product, comprising a computer readable non-transitory medium having a computer readable program code embodied therein, the computer readable program code adapted to be executed to implement a method in a computer system comprising an email message system that manages a plurality of email messages and an email archive system, wherein the email message system supports creation of user email accounts accessible by an email message client that executes on a client computer that a user of the client computer having an email account operates to manage the user's email messages accessible via the user's email account, the user's email messages comprising at least a portion of the plurality of email messages, the method comprising:

(A) creating a local email archive store on the client computer to store at least one archived email message having at least one property that includes a first setting, wherein the archived email was previously stored in a local email store on the client computer and was replaced with a short cut identifier that was stored in the local email store on the client computer, the short cut identifier including first information for retrieving the archived email message from the local email archive store, and second information comprising the first setting for managing the at least one property associated with the at least one archived email according to the first setting;

(B) editing the at least one property associated with the at least one archived email message, updating the second information of the short cut identifier stored in the local email store to reflect the edit to the at least one property associated with the at least one archived email message.

8. The computer program product of claim 7, wherein the editing of the at least one property comprises adding a property to the at least one archived email message.

9. The computer program product of claim 7, wherein the at least one property comprises a reminder time.

10. The computer program product claim 7, wherein the at least one property comprises a color flag.

11. The computer program product of claim 7, wherein the editing of the at least one property comprises adding a reminder relating to the at least one archived email message.

12. The computer program product of claim 7, wherein the updating the second information of the short cut identifier stored in of the local email store comprises changing the first property setting to a second property setting, different from the first property setting.

13. A computer system that manages a plurality of email messages and supports creation of user email accounts accessible by an email message client that executes on a client computer that a user of the client computer having an email account operates to manage the user's email messages accessible via the user's email account, the user's email messages comprising at least a portion of the plurality of email messages, the system comprising:

an email message system for managing a plurality of email messages, an email archive system having a plurality of archive servers for archiving at least one of the plurality of email messages, the email message system having an email application that executes on each of a plurality of client computers, each of the plurality of client computers having a local email store, an email archive client, and a local email archive store, wherein the local email store for each of the plurality of client computers stores a short cut identifier in place of an email message that was previously stored in the local email store, the email message currently being stored as an archived email message in the local email archive store of the one of the plurality of client computers by the email archive system, the short cut identifier including information for retrieving the archived email message from the local email archive store; and the email archive client, in response to a user of the one of the plurality of client computers setting at least one of a reminder on the archived email message or a color flag on the archived email message, configured to update the short cut identifier stored in the local email store to reflect the at least one of the reminder set on the archived email message in the local email archive store, or the color flag set on the archived email message in the local email archive store.

14. The system of claim 13, wherein the setting of the reminder on the archived email message comprises adding a time to the archived email message indicating when the email application should remind the user to follow up on the archived email message.

15. The system of claim 13, wherein the setting of the reminder on the archived email message comprises changing a time indicating when the email application should remind the user to follow up on the archived email message.

16. The system of claim 13, wherein the setting of the reminder on the archived email message comprises deleting a time indicating when the email application should remind the user to follow up on the archived email message.

17. The system of claim 13, wherein the setting of the color flag on the archived email message comprises adding a color flag to the archived email message.

18. The system of claim 13, wherein the setting of the color flag on the archived email message comprises changing a color of the color flag.

19. The system of claim 13, wherein the setting of the color flag on the archived email comprises removing the color flag from the archived email message.

* * * * *